W. H. BUTTERWORTH.
CONCAVE FOR THRESHING MACHINES.
APPLICATION FILED SEPT. 28, 1917.

1,259,954.

Patented Mar. 19, 1918.

Inventor—
William H. Butterworth,
by his Attorneys,
Howson & Howson

UNITED STATES PATENT OFFICE.

WILLIAM H. BUTTERWORTH, OF TRENTON, NEW JERSEY.

CONCAVE FOR THRESHING-MACHINES.

1,259,954.  Specification of Letters Patent.  Patented Mar. 19, 1918.

Application filed September 28, 1917. Serial No. 193,721.

*To all whom it may concern:*

Be it known that I, WILLIAM H. BUTTERWORTH, a citizen of the United States, and a resident of Trenton, county of Mercer, State of New Jersey, have invented certain Improvements in Concaves for Threshing-Machines, of which the following is a specification.

My invention relates to certain improvements in concaves for threshing machines of the type in which the grain is threshed from the head by a rubbing process.

The object of my invention is to provide means for preventing the straw from passing down between the blades of the concave with the grain as it is threshed.

This object I attain in the following manner, reference being had to the accompanying drawings, in which.

Figure 1:
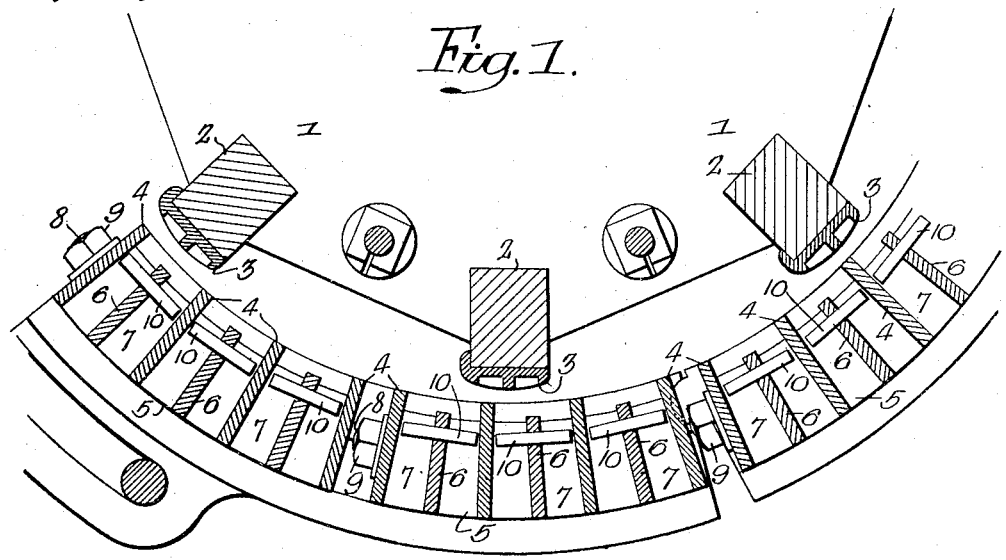
Figure 1 is a transverse sectional view of sufficient of a threshing machine to illustrate my invention, the section being taken through the concaves and a portion of the threshing cylinder.

Referring to the drawings, 1 is the cylinder of a threshing machine of the type in which the threshing is accomplished by the rubbing process. The cylinder has a series of longitudinal bars 2 provided with rubbing plates 3 in the present instance, which act in conjunction with the blades 4 of the concaves 5 to thresh the grain. There is usually a series of these concaves spaced apart and mounted in a carrier secured to the frame of the machine. This invention relates wholly to the construction of the concaves. I will merely describe one concave, shown clearly in the drawings.

Each concave consists of a series of blades 4 and bars 6, spaced apart and held together by any suitable means. The bars are less in height than the blades and alternate therewith, as clearly shown in Fig. 1. At each end of the concave are spacing blocks 7 and where the concave is of considerable length there are one or more spacing blocks intermediate the ends. The several blades and bars are held together by transverse bolts 8 having nuts 9 at one end, in the present instance. This construction is fully set forth and described in an application for patent filed by me on July 7, 1916, Serial No. 107,972. In this case, I rely upon the spacing of the bars and blades to prevent the straw passing through the concave with the grain, but I find that particles of straw have a tendency to pass through the space between the blades and bars and to avoid this I provide a series of transverse rods spaced a given distance apart forming, with the bars and the blades, a grid, which effectually prevents the passage of straw, or even particles of straw, through the concave.

Figure 2:
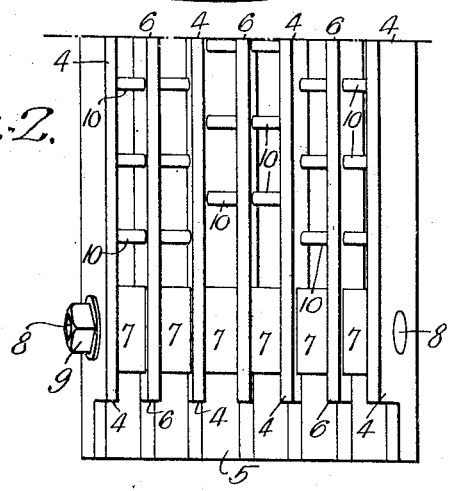
Fig. 2 is a plan view of a portion of one end of one of the concaves.
Figure 3:
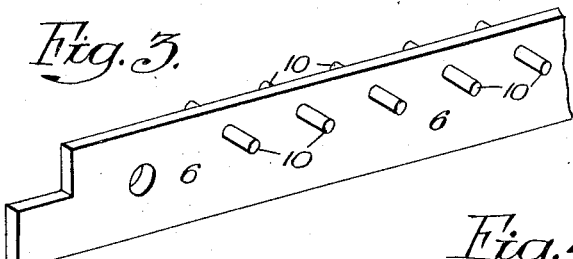
Fig. 3 is a detached perspective view of one of the bars.

In the present instance, I perforate the bars 6 some distance from the upper edge and place the rods 10 in the openings in the bars. These rods are of a length so as to fit between the blades, as clearly shown in Figs. 1 and 2. They need not touch the blades, but I prefer to make them a comparatively neat fit. The rods can be loosely mounted in the bars, as the blades keep the rods in position. I preferably alternate the arrangement of the rods, as shown in Fig. 2. This construction enables me to manufacture the concaves very cheaply, as all that is necessary is to drill holes in the bars and to assemble the rods when the concave is assembled, dispensing with screw threads, and other fastenings.

Figure 4:
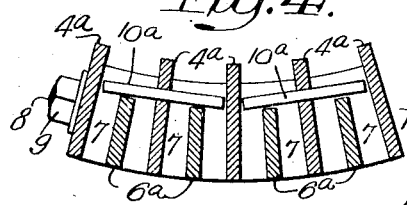

In some instances, instead of perforating the bars $6^a$, the alternate blades $4^a$, Fig. 4, may be perforated, and long rods $10^a$ may be inserted in the perforations. These rods will extend through one perforation to another and over the bars $6^a$.

Figure 5:
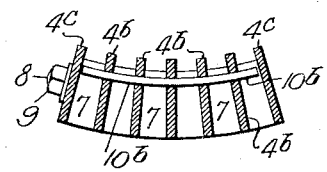
Figs. 4 and 5 are views illustrating modifications of the invention.

In Fig. 5, I have shown a still further modification in which the rods $10^b$ pass freely through the perforations in the series of inner blades $4^b$. The outer blades $4^c$ act as stops to limit the longitudinal movement of these rods.

The above construction makes the grid inexpensive to manufacture and it will completely prevent the straw from passing through the concave with the grain onto the cleaning sieves of the thresher. The straw will pass through the space between the concaves and the cylinder and will be discharged at the ends of the concaves.

I claim:

1. The combination in a concave, of a series of blades spaced apart; and a series of rods extending through some of the blades, the ends of the rods abutting against other blades so as to prevent longitudinal movement of said rods.

2. The combination in a concave, of a series of blades and bars alternately arranged and spaced apart to form channels for the passage of grain, the bars having transverse perforations; and short rods mounted in the perforations of the bars and extending across the spaces on each side of the bars and abutting against the sides of the blades so as to prevent their longitudinal movement.

3. The combination in a concave, of a series of bars longitudinally arranged and spaced apart, the bars having a series of transverse perforations; and short rods extending through the perforations and abutting against the blades so as to prevent longitudinal movement of said rods, the blades and bars forming a grid for separating the grain from the straw.

In witness whereof I affix my signature.

WILLIAM H. BUTTERWORTH.

Copies of this patent may be obtained for five cents each, by addressing the "Commissioner of Patents, Washington, D. C."